US009961199B2

(12) United States Patent
Seward et al.

(10) Patent No.: US 9,961,199 B2
(45) Date of Patent: May 1, 2018

(54) COMMUNICATION TERMINATION USING HUNT GROUPS AND IMPLICIT REGISTRATION

(71) Applicant: T-Mobile USA, Inc., Bellevue, WA (US)

(72) Inventors: Shelby Seward, Bellevue, WA (US); Robert F. Piscopo, Jr., Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days. days.

(21) Appl. No.: 14/854,492

(22) Filed: Sep. 15, 2015

(65) Prior Publication Data
US 2017/0078484 A1 Mar. 16, 2017

(51) Int. Cl.
*H04M 3/46* (2006.01)
(52) U.S. Cl.
CPC .............. *H04M 3/465* (2013.01); *H04M 3/46* (2013.01); *H04M 2207/18* (2013.01)
(58) Field of Classification Search
CPC .......... H04M 3/42; H04M 3/46; H04M 3/465; H04W 40/02; H04W 4/14
See application file for complete search history.

(56) References Cited

U.S. PATENT DOCUMENTS

| 5,802,160 | A  | 9/1998  | Kugell et al.    |
| 8,315,613 | B1 | 11/2012 | Rahman et al.    |
| 9,729,702 | B2 | 8/2017  | Seward et al.    |
| 2003/0125072 | A1 | 7/2003 | Dent             |
| 2004/0120552 | A1 | 6/2004 | Borngraber et al. |
| 2005/0075106 | A1 | 4/2005 | Jiang            |
| 2006/0089140 | A1 | 4/2006 | Zhang            |
| 2006/0094451 | A1 | 5/2006 | Lee              |
| 2006/0105766 | A1 | 5/2006 | Azada et al.     |

(Continued)

FOREIGN PATENT DOCUMENTS

| KR | 1020050018723 | 2/2005 |
| KR | 1020060056051 | 5/2006 |

(Continued)

OTHER PUBLICATIONS

"Can I get Multiple Google Voice Numbers to one Phone?", retrieved Mar. 20, 2015 at http://www.quora.com/Can-I-get-multiple-Google-Voice-numbers-to-one-phone?share=1, 4 pgs.

(Continued)

*Primary Examiner* — Daniel Lai
(74) *Attorney, Agent, or Firm* — Lee & Hayes, PLLC

(57) ABSTRACT

When authorized, a user of a computing device, such as a smart phone, may associate a telephone number that is assigned to a computing device with other computing devices. The other computing devices may or may not have an assigned device number. A user may also select to use the same number as the originating number of an electronic device. For example, a user may specify that each computing device associated with the user utilizes the same telephone number. The user may also specify that a computing device not utilize an assigned number. The associations of a device number with the computing devices may be stored as implicit registration data and/or as hunt groups.

18 Claims, 4 Drawing Sheets

(56) References Cited

U.S. PATENT DOCUMENTS

| | | | |
|---|---|---|---|
| 2006/0280169 A1 | 12/2006 | Mahdi | |
| 2007/0167158 A1 | 7/2007 | Ajjannavar et al. | |
| 2007/0206573 A1* | 9/2007 | Silver | H04W 76/022 370/352 |
| 2008/0043957 A1 | 2/2008 | Guo | |
| 2009/0061872 A1 | 3/2009 | Hicks | |
| 2010/0098057 A1* | 4/2010 | Stewart | H04M 3/46 370/352 |
| 2010/0291913 A1 | 11/2010 | Xu | |
| 2011/0045806 A1 | 2/2011 | Gupta et al. | |
| 2011/0061008 A1 | 3/2011 | Gupta et al. | |
| 2011/0163848 A1 | 7/2011 | Shibata | |
| 2011/0294472 A1 | 12/2011 | Bramwell et al. | |
| 2012/0033610 A1 | 2/2012 | Ring et al. | |
| 2012/0099719 A1* | 4/2012 | Erb | H04M 3/436 379/211.01 |
| 2012/0290638 A1* | 11/2012 | Narula | G06Q 10/10 709/203 |
| 2013/0065567 A1* | 3/2013 | Cui | H04M 7/006 455/415 |
| 2013/0157614 A1 | 6/2013 | Al-Zaben | |
| 2013/0288657 A1 | 10/2013 | Huang | |
| 2014/0052793 A1* | 2/2014 | John | H04W 4/12 709/206 |
| 2015/0215459 A1* | 7/2015 | Kirchhoff | H04M 3/436 379/266.07 |
| 2015/0244862 A1 | 8/2015 | Salazar et al. | |
| 2016/0337513 A1 | 11/2016 | Seward et al. | |
| 2016/0337825 A1 | 11/2016 | Piscopo, Jr. et al. | |
| 2017/0041460 A1 | 2/2017 | Seward et al. | |

FOREIGN PATENT DOCUMENTS

| | | |
|---|---|---|
| KR | 1020070060616 | 6/2007 |
| KR | 1020070074291 | 7/2007 |
| KR | 1020100113664 | 10/2010 |
| KR | 1020120058203 | 6/2012 |
| KR | 1020130140332 | 12/2013 |
| WO | WO02089510 | 11/2002 |
| WO | WO2006085303 | 8/2006 |

OTHER PUBLICATIONS

Garcia-Martin et al, "Private Header (P-Header) Extensions to the Session Initiation Protocol (SIP) for the 3rd Generation Partnership Project (3GPP)", Jan. 2003, Network Working Group, RFC 3455, 34 pages.

Summerson, "Goggle Voice Now Lets You Have Multiple Numbers on One Account-for-a-Fee", Jun. 2011, retrieved Mar. 20, 2015 at www.androidpolice.com/2011/06/10/google-voice-now-lets-you-have-multiple-numbers-on-one-account-for-a-fee/, 4 pgs.

PCT Search Report and Written Opinion dated Jul. 27, 2016 for PCT application No. PCT/US2016/031793, 11 pages.

PCT Search Report and Written Opinion dated Aug. 3, 2016 for PCT application No. PCT/US2016/029188, 14 pages.

Office action for U.S. Appl. No. 14/710,861 dated Mar. 24, 2016, Piscopo Jr. et al., "Routing Multiple Number for One Telecommunications Device", 10 pages.

Office action for U.S. Appl. No. 14/710,812, dated Apr. 5, 2016, Seward et al., "Client Application Enabling Multiple Line Call Termination and Origination", 15 pages.

Office action for U.S. Appl. No. 14/710,861 dated Sep. 23, 2016, Piscopo Jr. et al., "Routing Multiple Numbers for One Telecommunications Device", 9 pages.

Office action for U.S. Appl. No. 14/710,861 dated Sep. 28, 2016, Piscopo Jr. et al., "Routing Multiple Numbers for One Telecommunications Device", 6 pages.

Office action for U.S. Appl. No. 14/710,812, dated Sep. 28, 2016, Seward et al., "Client Application Enabling Multiple Line Call Termination and Origination", 17 pages.

PCT Search Report and Written Opinion dated Oct. 20, 2016 for PCT Application No. PCT/US16/42847, 10 pages.

PCT Search Report and Written Opinion dated Dec. 20, 2016 for PCT Application No. PCT/US16/50540, 13 pages.

Office action for U.S. Appl. No. 14/816,461, dated May 18, 2017, Seward, "Originating a Voice Call from a Selected Number Using a Temporary Routing Number", 7 pages.

Office Action for US Patent Application, dated Sep. 12, 2017, Seward, "Client Application Enabling Multiple Line Call Termination and Origination", 11 pages.

* cited by examiner

COMMUNICATION TERMINATION USING HUNT GROUPS AND IMPLICIT REGISTRATION

BACKGROUND

A computing device, such as a wireless phone, that is capable of terminating (e.g., receiving or originating) phone calls and other communications is typically associated with a particular phone number. The computing device can originate phone calls whose calling number is the particular phone number or may receive communications at the particular phone number. In some cases, a person may carry multiple computing devices in order to have the use of different phone numbers. Not only is this cumbersome for the user, but wasteful because the user has to acquire multiple computing devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
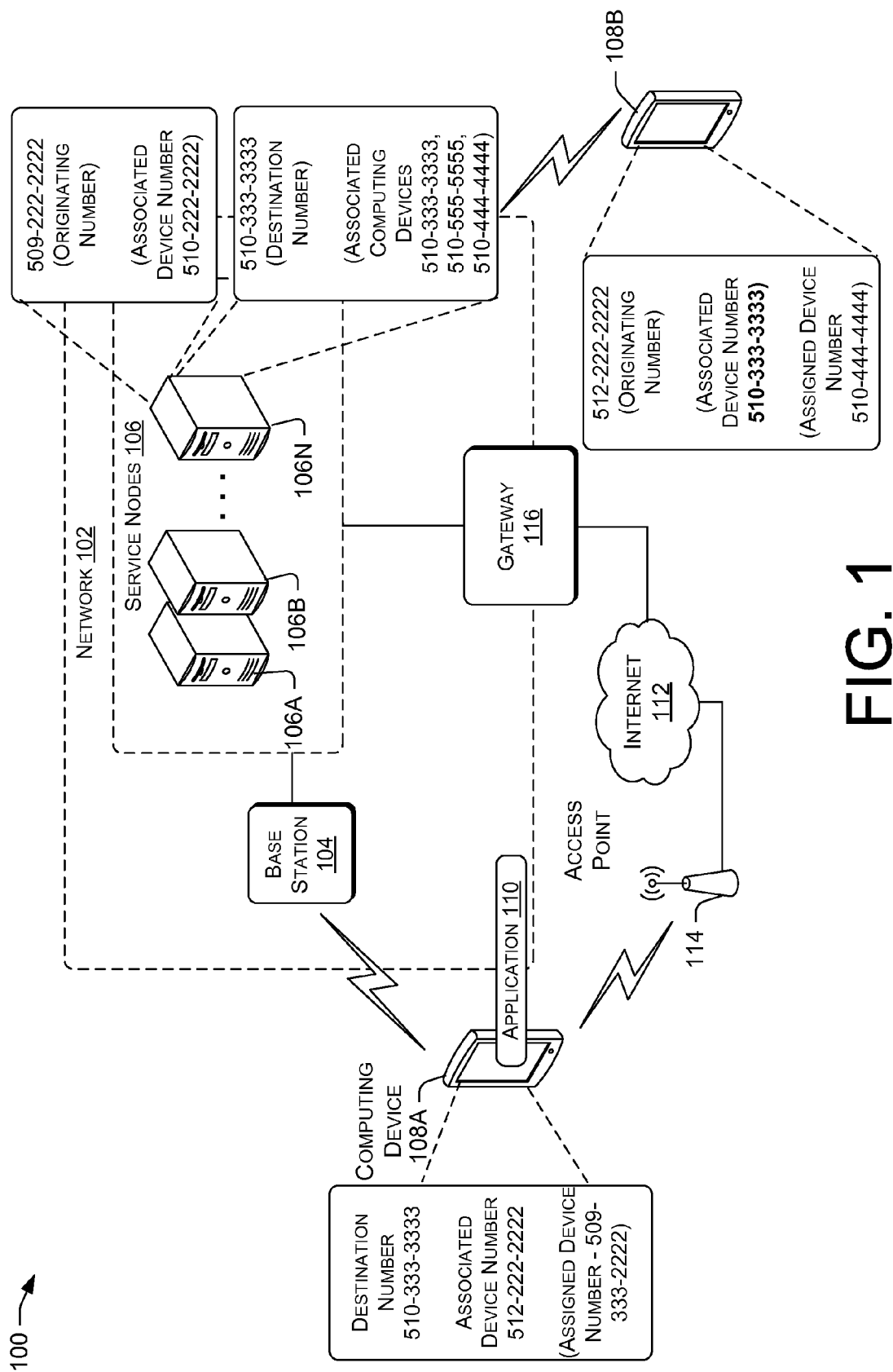
FIG. 1 is a block diagram showing an illustrative environment for terminating a communication using a device number associated with more than one computing device.

Described herein are techniques and systems for communication termination using hunt groups and implicit registration. Using techniques described herein, a computing device, such as a smart phone, may be associated with a telephone number other than the one assigned to the computing device. For instance, instead of each computing device having to be associated with a particular telephone number, more than one computing device may be associated (e.g., registered) with a particular telephone number. After being associated with a particular telephone number, a computing device may receive and/or originate communications using the associated number.

When a user acquires (e.g., purchases, leases, etc.) a computing device, such as a wireless phone, the wireless service provider (e.g., a carrier, such as T-Mobile®) may assign an International Mobile Subscriber Identity (IMSI) and/or an E.164 address (e.g., up to a fifteen digit telephone number) that is specific for the user associated with the computing device. As used herein, a "device number" is the E.164 address or identity assigned (such as an IMSI) to the computing device by the wireless service provider.

In some configurations, the wireless service provider may allow a user to associate one or more other computing devices with the device number. For example, a user might access an interface, such as a web page, provided by the wireless service provider to specify associations of a particular device number with one or more other computing devices. In other examples, the user might use a graphical user interface (GUI), such as a telephony client, or some other interface, to associate computing devices with a device number assigned to a particular computing device. In some cases, the user might authorize a computing device associated with another subscriber of the wireless service to utilize a device number. In other cases, a user might associate a group of computing devices with a particular device number. For instance, a business owner might allow computing devices of employees of the business to be associated with a business number.

After a user has authorized another device to be associated with a device number, the wireless service provider may terminate communications to all or a portion of the computing devices that are associated with that device number. Generally, in response to a network associated with the wireless service provider receiving a request to send a communication (e.g., a voice call, a Short Message Service (SMS) message, or a Multimedia Messaging Service (MMS) message) to a particular telephone number, the network determines what computing devices are associated with the number. Depending on configuration preferences, the network may send the communication to all or a portion of the computing devices that are associated with the telephone number. In some configurations, the network may determine the currently active computing device(s) that are associated with the telephone number and direct the communication to those devices.

According to some configurations, the network may synchronize communications across all of the different devices associated with a device number such that each device contains a complete record of a communication thread. For instance, an SMS thread may be replicated across each computing device that is associated with the telephone number used for the communications.

Instead of placing all calls from a device using a single telephone number (the device number), different computing devices may be associated with a single device number that acts as the originating number. As such, the called party may view a received communication as being originated by the device number of another computing device even though the call was originated by a device having a different assigned device number. Thus, a user may originate an outgoing communication, such as a call or text message, from the computing device where the outgoing communication appears to have originated from a different number than a phone number associated with the computing device (and different from the device number associated with the user's wireless phone). More details are provided below with regard to FIGS. 1-4.

FIG. 1 is a block diagram showing an illustrative environment 100 for terminating a communication using a device number associated with more than one computing device. The environment 100 may include a network 102 that is operated by a wireless service provider. The environment 100 is illustrated in simplified form and may include many more components.

The network 102 may include one or more base stations 104 and one or more service nodes 106. A base station 104 may handle traffic and signals between electronic devices, such as the computing devices 108A and 108B, and a core network of the network 102. For example, the base station 104 may perform the transcoding of speech channels, allocation of radio channels to electronic device, paging, transmission and reception of voice and data, as well as other functions. The base station 104 may include several base transceiver stations (BTS), each BTS may include a transceiver, antenna, and additional network switch and control equipment that provide a network cell for facilitating wireless communication between computing devices and the core network of the network 102.

The core network may be responsible for routing voice communication to other networks, as well as routing data communication to external packet switched networks, such as the Internet. For example, the one or more service nodes 106 may be a Gateway GPRS Support Node (GGSN) or another equivalent node. The computing devices 108A and 108B may be a smart phone, a personal digital assistant, a netbook, a laptop computer, and/or another electronic that is capable of sending or receiving voice or data via the network 102 and/or a Wi-Fi network.

In some configurations, one or more of the service nodes 106 may be configured as one or more application servers that provide support for one more applications, such as application 110. While the service nodes 106 are illustrated within the network 102, one or more other computing devices may be located outside of the network 102. For example, an application server, or some other server or device, may be connected to the network 102 via one or more external packet switched networks, such as the Internet.

According to some configurations, a telephony client application, such as application 110, on the computing device 108 may establish data communication with the network 102 through a data connection to the base station 104. The base station 104 may route a communication from the communication device 108 through the core network via the service nodes 106. In such instances, the service nodes 106 may be capable of performing subscriber profile insertion with respect to data traffic between the application 110 on the computing device 108 and the application server.

For example, the application 110 may be a calling application that is requesting to place an outgoing call to a destination number "510-333-3333." In the current example, the computing device 108A is associated with the device number "512-222-2222" even though the device number that is assigned to the computing device 108A is "509-333-2222". As discussed briefly above, a user authorized to associate a device number with the computing device 108A may have established the association using an interface coupled to the network 102.

For instance, a user may have used a web interface to establish the association of the computing device 108A with the device number already associated with another device. In some examples, the service nodes 106 may store this association data within a memory or database.

In some examples, in response to receiving a request to place a call to the destination number, the service nodes 106 may determine the computing devices that are associated with the destination number. For example, one or more of the service nodes 106 may perform a look up that identifies that the destination number "510-333-3333" is associated with a computing device originally assigned the destination number (not shown), a computing device having an originally assigned device number of "510-555-5555", and the computing device 108B that has an originally assigned device number of "510-444-4444." In some configurations, the associations may be stored as "hunt groups" or as implicit registrations.

A hunt group is a group of two or more phone numbers to which a phone call may be distributed. For example, in one type of hunt group, a call is routed to a first number listed in the hunt group. In another type of hunt group, the call may be routed to all or a portion of the numbers in the hunt group. More details regarding hunt groups are provided below with reference to FIG. 2. As used herein, "implicit registration" may refer to a group of IMPU's (Public Identities, in this case similar to a MSISDN/Phone-Number) that get registered on a user's behalf. For example, when a user registers with the network, and the registration is successful, the network may send back an implicit registration set associated with the network (e.g., other numbers that may be used by the user). In some instances, the user registers with a phone number, the network registers the number and implicitly registers other numbers on the user's behalf. After registration, the user may use the number explicitly used during registration as well as one or more other numbers implicitly registered.

In some examples, multiple users can have the same implicit registration set. This allows for multiple devices to have the same set of phone numbers though each device may have used a different IMPU to register with. For instance, device 1 registers with IMPI 1/IMPU 1, device 2 registers with IMPI 2/IMPU 2, and the like but all of the devices implicitly get registered with the same set of numbers because each device is associated with the same implicit registration set.

According to some examples, there may be barred IMPUs and un-barred IMPUS in an IRS (Implicit Registration Set). Barred IMPUs may be used for registration but cannot be used to originate and/or receive a communication. For purposes of illustration, assume that IMPUs 2 and 3 in the above example are barred. Now devices 1, 2, and 3 each have IMPUs 1, 2, and 3 registered however each of them can only use IMPU 1. Thus each of the devices 1, 2, and 3 have the same single useable phone number, IMPU 1.

In the current example, the service nodes 106 may retrieve the association data that corresponds to the IMSI of the computing device 108A requesting the communication. The data may include information specifying the associated device number to use as the originating number for the communication. Accordingly, when a communication request arrives at the network 102, the service nodes 106 may determine the originating number for the communication as well as the computing devices to send the communication.

According to some configurations, the application 110 on the computing device 108 may connect to the service nodes 106, or some other component such as an application server, via the Internet 112. In such instances, the application 110 may connect to the Internet 112 via Wi-Fi access point 114. Accordingly, data traffic from the application 110 may be routed to the service nodes 106 by the gateway 116 of the network 102.

In either case, the computing device 108 requests to make a communication (e.g., a call, an SMS, an MMS, or some other form of electronic communication) with a destination number. The network 102 receives the request and, in some cases, may authenticate the user and/or the computing device. For example, the service nodes 106 may authenticate the computing device 108.

As briefly discussed, the service nodes 106 may also determine the originating number to use (as indicated by an association of the computing device 108A with a device number). In some cases, the service nodes 106 may query a database, or some other data store or memory, to determine the originating number and the computing devices associated with the requested destination number.

Using the determined originating number, the network 102 may initiate the communication to the identified computing devices associated with the destination number. For example, the network initiates communication with the computing device 108B. As illustrated, the display of the computing device 108B shows that the originating number is "512-222-2222" even though the assigned device number of the computing device 108A is "509-333-2222". As such, the called party may view the communication as being originated by the associated device number even though the call was originated by a device in which the assigned device number is different. More details are provided below.

Figure 2:
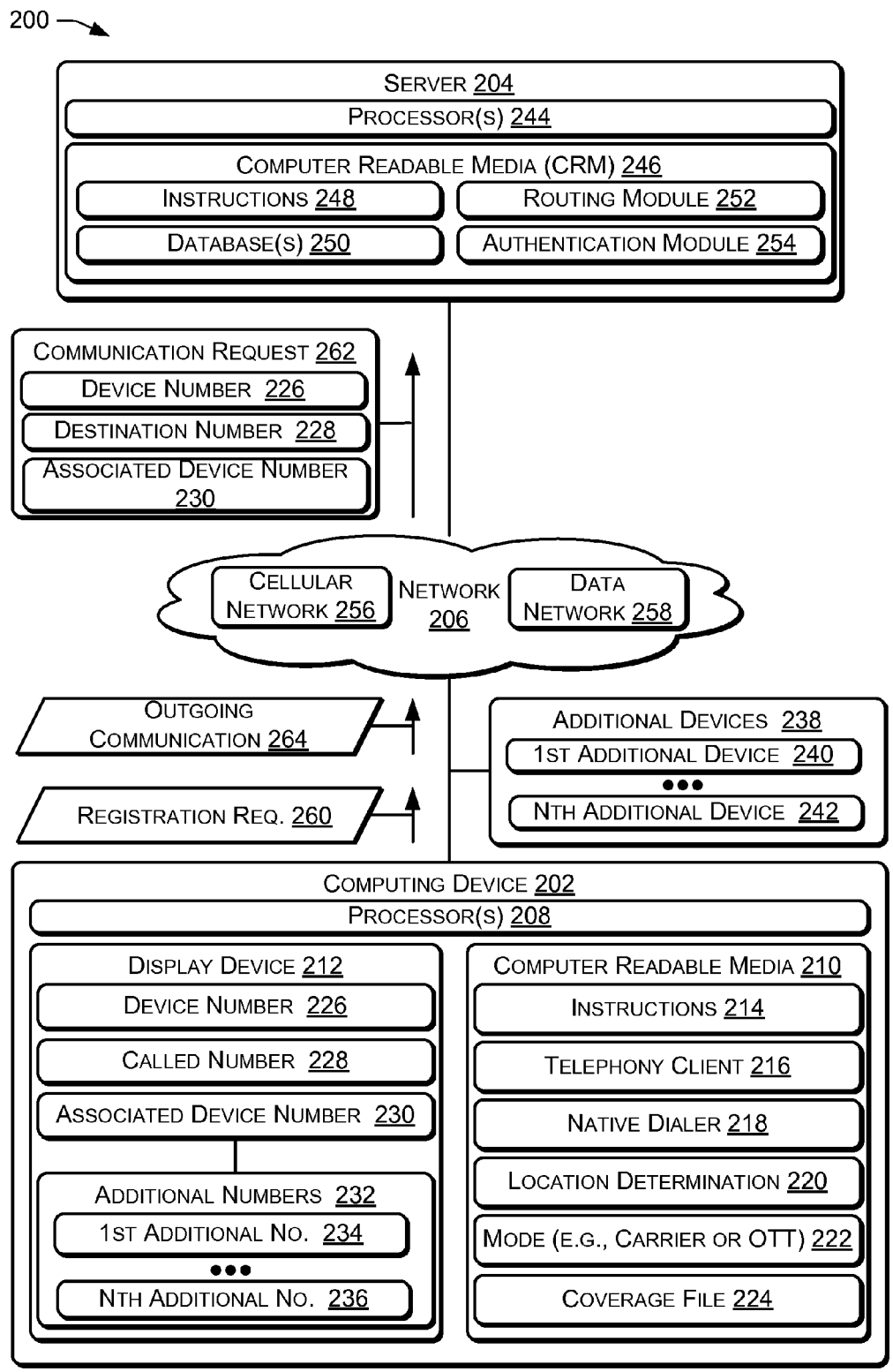
FIG. 2 is a block diagram illustrating a system that includes a telephony client application for originating a communication from an associated device number of a computing device instead of the assigned device number.

FIG. 2 is a block diagram illustrating a system 200 that includes a telephony client application for originating a communication from an associated device number of a computing device instead of the assigned device number according to some implementations. The system 200 includes a computing device 202 coupled to a server 204 via a network 206. The computing device 202 may be configured similarly to the computing device 108. Similarly, the network 206 may be the same network as network 102 illustrated in FIG. 1.

The computing device 202 may be a wireless phone, a tablet computer, a laptop computer, a wristwatch, or other type of computing device. The computing device may include one or more processors 208 and computer readable media, such as memory (e.g., random access memory (RAM), solid state drives (SSDs), or the like), disk drives (e.g., platter-based hard drives), another type of computer-readable media, or any combination thereof.

The computer readable media 210 may be used to store instructions to perform various functions and to store data. For example, the computer readable media 210 may include instructions 214, a telephony client 216, a native dialer 218, a location determination module 220, a current mode 222 of operation, and a coverage file 224. Of course, the computer readable media 210 may also include other types of instructions and data, such as an operating system, device drivers, etc. The telephony client 216 may enable a user to place a communication (e.g., a voice call, an SMS, or an MMS) and/or associate a device number with one or more computing devices. For instance, the telephony client 216 may be used by a user to place a call that originates from a number that is different from the phone number associated with the user's wireless phone.

The native dialer 218 (also known as a mobile dialer) may be an application that enables calls to be originated via Voice over Internet Protocol (VoIP), circuit switched voice, or some other protocol, using Session Initiation Protocol (SIP) signaling. The location determination module 220 may determine a current location of the computing device 202. For example, the location determination module 220 may determine the current location using the Global Positioning System (GPS). The current location as determined by the location determination module 220 may determine the mode 222. For example, if the current location of the computing device 202 is within a geographic area in which a carrier, associated with a device number 226 of the computing device 202, provides coverage, then the mode 222 may be set to cellular mode. If the current location of the computing device 202 is in a geographic area in which the carrier does not provide coverage (e.g., a location in which a wireless phone associated with the device number 226 would normally roam), then the mode 222 may be set to Over-The-Top (OTT) mode.

The display device 212 may be separate from the computing device 202 or integrated (e.g., as illustrated in FIG. 2) with the computing device 202. The display device 212 may display various information associated with originating a call. For example, the display device 212 may display one or more of the device number 226, or other numbers that are authorized to be used as an originating number 230 that is selected from one of the additional numbers 232. In addition to being used as a conventional 10 digit phone number, the device number 226 may also be used as a Uniform Resource Identifier (URI), e.g., as an IMPU, a unique permanently allocated global identity assigned by a home network operator (e.g., the carrier).

The destination number 228 may be the number of another user to communicate with or call. In other words, the destination number 228 is the location to which the call is routed. As discussed herein, the associated device number 230 that is associated with an outgoing call may be different from the device number assigned to the computing device. By default, the originating number 230 may be the device number 226 that is associated with the device, and if there is not an associated device number, the device number originally assigned to the device.

The additional numbers 232 may include numbers that are authorized to be associated with other computing devices by the user. For example, the user might be authorized to associate numbers associated with (i) family members of a user of the computing device 202, (ii) businesses (or other activities) associated with the user of the computing device 202, (iii) friends, or all or some combination of (i), (ii), and (iii). The additional numbers 232 may be assigned to additional devices 238. For example, the first additional number 234 may be assigned to a first additional device 240 and the Nth additional number 236 may be assigned with an Nth additional device 242. An authorized user may associate the same number to one or more of the additional devices 242.

The server 204 may include one or more processors 244 and one or more computer readable media 246. The computer readable media 246 may be used to store instructions 248, one or more databases 250, a routing module 252, and an authentication module 254. The instructions 248 may be executed by the processors 244 to perform the various functions described herein. The databases 250 may include a database storing information, such as which additional numbers are associated with a device number, etc. The routing module 252 may be used to setup and route calls from the computing device 202 in which the associated device number 230 is different from the device number 226.

The authentication module 254 may perform various types of authentication, including determining whether the user associated with the device number 226 is authorized to associate one or more of the additional numbers 232 with another device. For example, the authentication module 254 may be used to authenticate that a user is authorized to associate a selected number.

The network 206 may include one or more networks, such as a cellular network 256 and a data network 258. The cellular network 256 may provide wide-area wireless coverage using a technology such as Global System for Mobile (GSM), Code Division Multiple Access (CDMA), Universal Mobile Telephone Service (UMTS),), a Universal Terrestrial Radio Access Network (UTRAN), an evolved UTRAN network (E-UTRAN) (e.g., Long Term Evolution (LTE), a Global System for Mobile communication (GSM) EDGE Radio Access Network (GERAN), a voice over LTE (VoLTE), or some other type of network. While communications between the cellular network 256 and computing devices (e.g., the computing device 202) may be performed using a wide-area wireless network, the cellular network 256 may include other technologies, such as wired (Plain Old Telephone Service (POTS) lines), optical (e.g., Synchronous Optical NETwork (SONET) technologies, and the like.

The data network 258 may include various types of networks for transmitting and receiving data (e.g., data packets), including networks using technologies such as Institute of Electrical and Electronics Engineers (IEEE) 802.11 ("WiFi"), IEEE 8021.15.1 ("Bluetooth"), Asynchronous Transfer Mode (ATM), Internet Protocol (IP), LTEm and the like. The data packets may be used to carry voice traffic using VoIP or other technologies as well as data traffic.

In some situations, such as after being powered-on or at periodic intervals, the computing device 202 may use the location determination module 220 to determine a current location of the computing device 202 and set the mode 222 to either cellular mode (e.g., when the current location is in a service area of a carrier associated with the device number 226) or OTT mode (e.g., when the current location is outside a service area of a carrier associated with the device number 226).

The telephony client 216 may send a registration request 260 to register the computing device 202 with a local carrier's network. For example, the telephony client 216 may send the registration request 260 to the server 204 to register the computing device 202 with the local carrier associated with the network 206. The registration request 260 may be received by the server 204 that may be configured as a serving call session control function ("S-CSCF") server that is part of an internet protocol multimedia subsystem ("IMS"). The registration request may include a feature tag that specifies different features to register for with one or more application servers. For example, the feature tag may include features, such as, but not limited to a multimedia telephony ("MMTEL") feature, a short message session initiation protocol ("SMSIP") feature, a rich communication services ("RCS") feature, and the like. In some configurations, the registration request 260 may also indicate to register the computing device using an associated device number 230 in place of the device number 226.

The registration request 260 may indicate whether the computing device is registering in cellular mode (e.g., to use the cellular voice network 256) or OTT mode (e.g., to use the data network 258). In cellular mode, the computing device 202 may originate calls and terminate calls using the cellular voice network. In OTT mode, the computing device 202 may originate calls and terminate calls using the data network 258 (e.g., via VoIP).

When a user desires to originate a communication using the computing device 202, the telephony client 216 may prompt the user to select (or enter) the destination number 228 (e.g., the destination of the call). The number used as the originating number by the network may default to the associated device number 230.

The computing device 202 may send, to the server 204, a communication request 262 that includes the assigned device number 226, and the destination number 228. The communication request 262 informs the server 204 that a communication will be placed from a device (e.g., the computing device 202) that is associated with the device number 226 to the destination number 228 and requests that the server 204 modify the calling line indication (CLI) associated with the call by using the associated device number 230 as the caller identifier rather than the device number 226. The call record includes data associated with a call that is used primarily for billing purposes.

By using the associated device number 230 as the CLI (e.g., instead of the device number 228) the call will appear to the person being called as originating from the associated device number 230 rather than the device number 228. For example, a user may use the user's personal phone (e.g., computing device) to place a call that appears to originate from the user's business (or other activity in which the user engages) rather than the user's personal phone. The user is thus able to keep the user's personal phone number private (e.g., because the CLI displayed to the called party is the associated device number 230) while still making use of the user's personal phone to place calls for the user's business (or other activity). As another example, a spouse may use the user's computing device (e.g., phone) to place a call that appears to originate from the spouse's computing device rather than the user's computing device. For example, if the spouse's computing device is inoperable (e.g., dead battery etc.) or unavailable (e.g., spouse left it behind), the spouse can place calls using the user's computing device while the calls appear to originate from the spouse's computing device. In this way, family members can place calls from a single computing device while making the calls appear as if they were originating from the family member's computing device. As another example, an employee of a business may use their phone, or other computing device, to place a call that appears to originate from the user's business line.

After receiving the communication request 262, the authentication module 254 may authenticate the communication request 262 and determine whether the account associated with the device number is authorized to originate calls from the associated device number 230. For example, the authentication module 254 may retrieve account information from the database(s) 250 to determine if the account associated with the device number 226 is authorized to originate calls from the associated device number 230. When the account associated with the device number 226 is not authorized to originate calls from the associated device number 230, the server 204 may send a message to the computing device 202 denying the communication request 262. When the account associated with the device number 226 is authorized to originate calls from the associated device number 230, the server 204 may place the communication to the computing device(s) associated with the destination number 228.

When a communication request 262 is received by the network 206 for routing to a particular computing device (e.g., the computing device 202), the network 206 determines the destination number 226. The destination number 226 may be associated with a single computing device or more than one computing device. For instance, the destination number 226 may be part of a hunt group and/or the destination number 226 may be implicitly registered and associated with one or more other computing devices.

In some configurations, the network 206 determines if the called number 204 is part of a hunt group. As briefly discussed above, a hunt group is a group of two or more phone numbers to which phone calls originating to a single telephone number may be distributed. For example, in one type of hunt group, a call is routed to a first number in the hunt group. If the first number is busy or the call goes unanswered by the first number, then the call is routed to a second number and so on, until the call is answered (if all numbers in the hunt group have been tried and the call remains unanswered, the call may be routed to a voice mail box or the call may be routed back to the first number).

In another type of hunt group (e.g., simultaneous hunt group), the call may be routed to the multiple numbers belonging to the hunt group substantially contemporaneously (e.g., simultaneously), e.g., causing the multiple numbers in the hunt group to indicate (e.g., using a ring tone) that a communication is being received. When one of the numbers in the hunt group answers, or otherwise receives, the communication, the remaining numbers in the hunt group no longer receive the communication (e.g., the remaining numbers no long indicate that an incoming call is being received). In some implementations, the hunt group may be a simultaneous hunt group.

In other configurations, the communication may be routed to the device currently being used (or most recently used) by the subscriber. For example, if a call is received while a user is using a particular device, the particular device may receive the call without the other devices that are part of the hunt group receiving the call.

The hunt group may be created when a user with a device having a number acquires one or more additional devices with corresponding additional phone numbers and requests that the carrier associate two or more numbers to create a hunt group. For example, the user may initially acquire the computing device 202 that has the device number 226. The user may subsequently acquire the additional devices 238 and request that the carrier create the hunt group and include the device number 226 and the additional numbers 232 (e.g., associated with the additional devices 238) in the hunt group.

When the destination number 228 is associated with a hunt group, the network 206 may simultaneously route the communication to the numbers in the hunt group, e.g., to the computing device 202 and to one or more the additional devices 238. The computing device 202 and the additional devices 238 may each display the associated device number 230 in their corresponding display devices to enable a user of each device to determine whether or not to terminate (e.g., answer) the incoming call.

One of the computing device 202 or the additional devices 238 may provide an instruction to terminate (e.g., answer) the incoming communication. The remaining devices may then no longer indicate that the incoming communication has been routed to the devices. For example, the user of the computing device 202 may choose to terminate the incoming communication. The additional devices 238 associate with the destination number may no longer indicate the presence of the incoming communication.

The routing module 252 may change the call record associated with the outgoing communication 264 such that the outgoing communication 264 appears to be originating from the associated device number 230 rather than the device number 226. For example, the call record may initially identify the device number 226 as the number from which the outgoing communication 264 is being placed. The routing module 252 may change the communication record associated with the outgoing communication 264 by substituting the associated device number 230 for the device number 226 in the call record, making the outgoing communication 264 appear to have been placed from a device associated with the associated device number 230.

Figure 3:
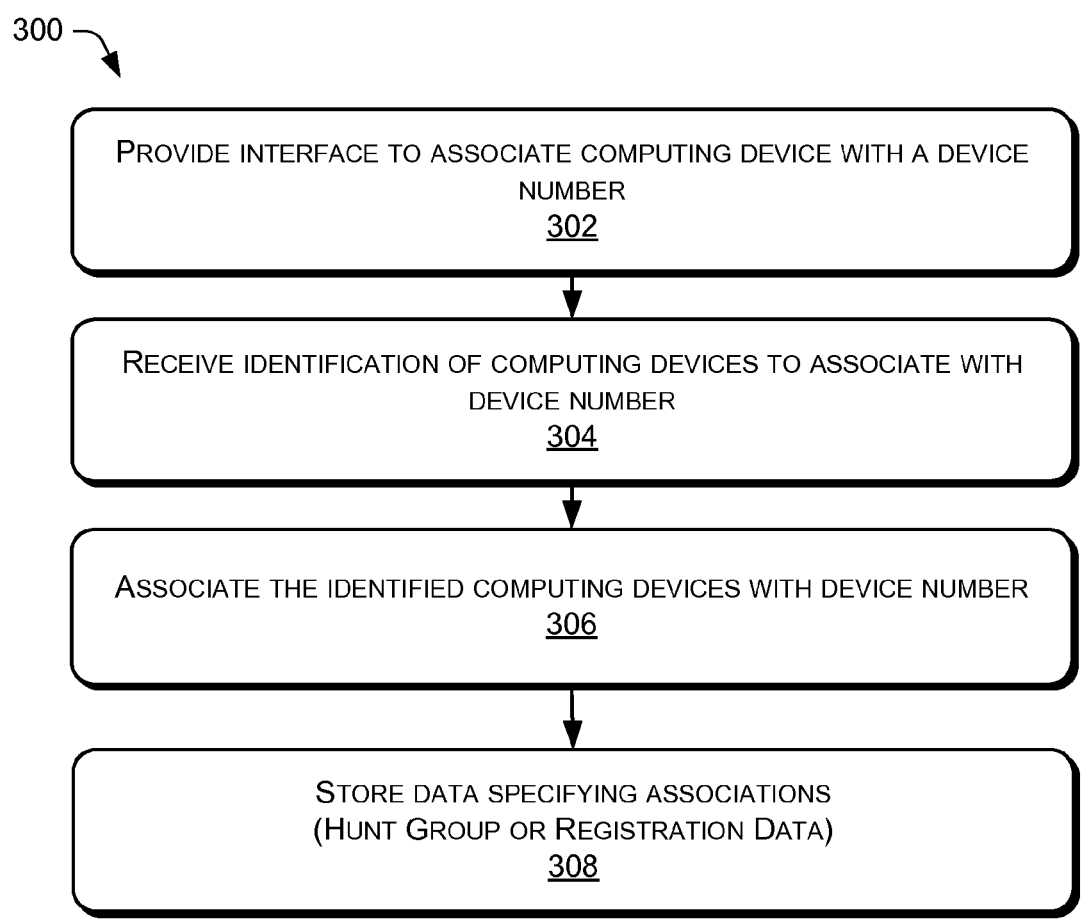
FIG. 3 is a flow diagram of an example process that includes associating a device number assigned to a particular computing device with one or more other computing devices according to some implementations.
Figure 4:
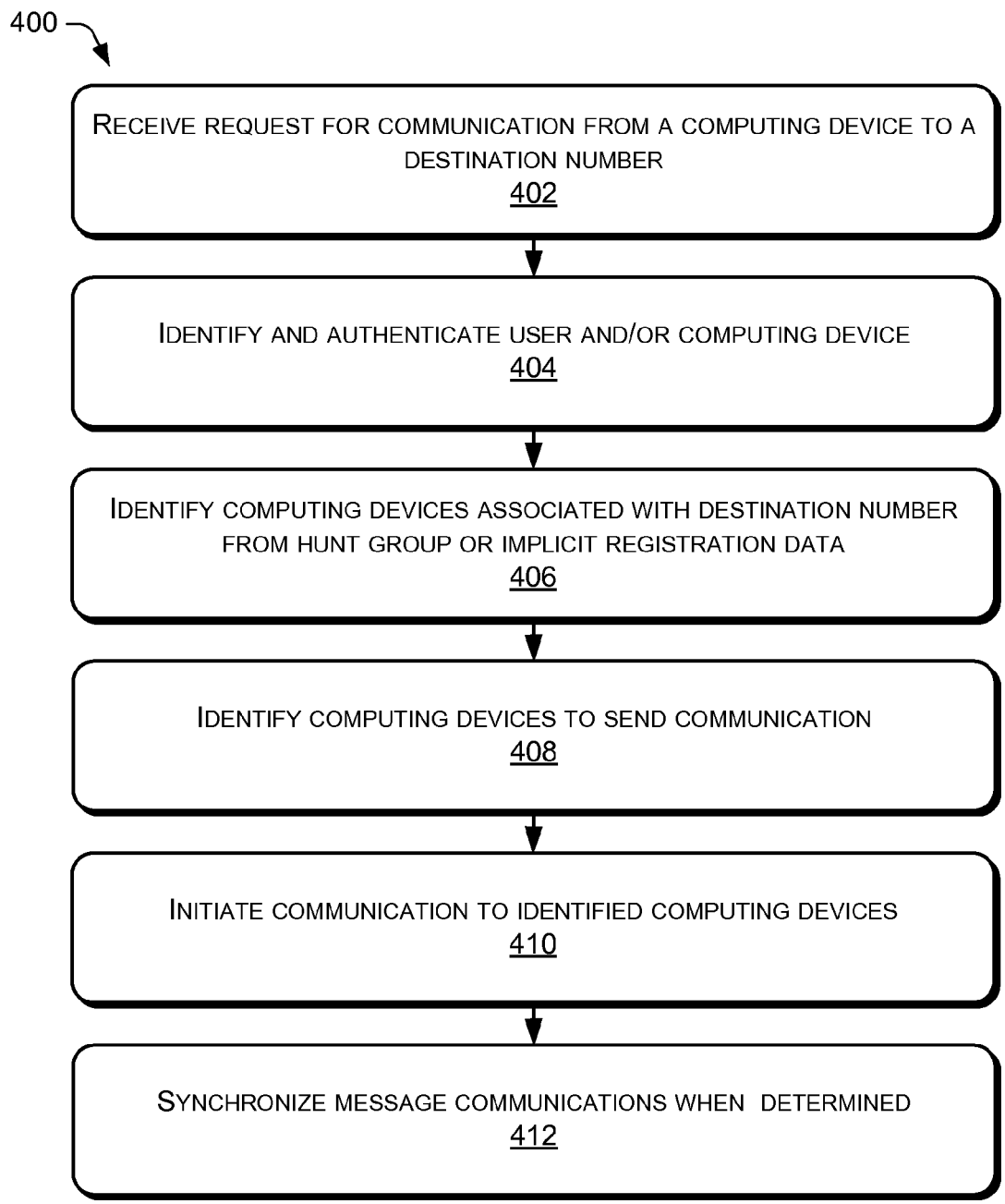
FIG. 4 is a flow diagram of an example process that includes a network for communication termination using hunt groups and implicit registration according to some implementations.

In the flow diagrams of FIGS. 3 and 4, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400 and 500 are described with reference to the systems 100, 200, and 300, as described above, although other models, frameworks, systems and environments may implement these processes.

FIG. 3 is a flow diagram of an example process 300 that includes associating a device number assigned to a particular computing device with one or more other computing devices according to some implementations. The process 300 may be performed by one or more computing devices, such as the computing devices described with regard to FIGS. 1-2.

At 302, an interface to associate a computing device with a device number already assigned to a computing device is provided. As discussed above, the interface may be a portal that allows a user to associate one or more computing devices with a particular device number. In some examples, the user may be authorized to assign device numbers associated with computing devices they own and possibly other device numbers that may be associated with other subscribers of the wireless network. For instance, a business owner may authorize one or more of the employees to assign a particular device number to one or more other computing devices.

According to some configurations, device numbers that may be associated with other computing devices may be displayed to the user. For instance, the user may be authorized to use other numbers that are associated with family members, friends, business associations, and the like. In some examples, any user may authorize another user to use one or more of their device numbers with a computing device. In other examples, a subscriber affiliated with a wireless network provider may authorize other subscribers of the wireless network provider to use one or more device numbers affiliated with the subscriber.

At 304, an identification of computing devices to associate with a device number assigned to a particular computing device is received. As discussed above, the user may select (e.g., using a graphical user interface) one or more computing devices 102 that they are authorized to use to associate with the device number. In other examples, the user might use a voice interface to specify the originating number or specify the originating number using some other interface.

At 306, the identified computing devices are associated with the device number. As discussed above, registration data may be stored by the network (e.g., by an application server or some other computing device) that identifies the computing devices that are associated with a particular device number. The registration data may include, but is not limited to, the device number to associate, the device number and/or some other identifier that uniquely identifies a computing device that is to be associated with the device number, and any preferences that may be specified. For instance, the preferences may specify communication preferences for the associated number. The communication preference may specify to always send communications to the computing device, send communications to the device when currently being used, and the like.

At 308, the data specifying the associations is stored. As discussed above, an application server, or some other computing device, may store the preferences within a database, or some other memory. In some examples, the data is stored as hunt groups. In other examples, the data is stored as registration data (e.g., within a lookup table, or some other data structure for access).

FIG. 4 is a flow diagram of an example process 400 that includes a network for communication termination using hunt groups and implicit registration according to some implementations. The process 400 may be performed by one or more computing devices, such as the computing devices described with regard to FIGS. 1-2.

At 402, a request is received for a communication from a computing device to a destination number. As discussed above, the request may be a request to originate a voice call, send an SMS or MMS, or some other type of electronic communication. Generally, the communication includes a desired destination number for the communication. As also discussed above, a user may utilize the application 110, or some other interface, to specify the destination number.

At 404, the user and/or computing device that is associated with the request to initiate the communication may be authenticated. According to some configurations, the authentication includes determining that the user is authorized to place the communication.

At 406, the computing devices associated with the destination number may be determined. In some examples, one or more of the service nodes 106 may access a data store, or some other memory, to retrieve and identify the computing devices that are associated with the destination number. For example, the service nodes 106 may access a database that includes the computing devices that are associated with the destination number (e.g., the computing devices assigned the destination number as a device number).

At 410, the communication may be initiated to the computing devices from the network. As discussed above, the network may call the computing devices associated with the destination number.

At 412, the message communications between computing devices may be synchronized. As discussed above, the message communications between the computing devices that are associated with the same device number may be synchronized by one or more computing devices affiliated with the network. In this way, if a user picks up another computing device that is associated with the device number, the user will see the entire conversation and may easily pick up the conversation if desired.

The various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method performed by one or more processors configured with specific instructions, the computer-implemented method comprising:

receiving, at a network affiliated with a wireless service provider, a request to initiate a communication from a first computing device, the request specifying a calling number associated with the first computing device, an origination number different from the calling number, and a destination number;

authenticating the request by determining that an account associated with the calling number is authorized to originate communications from the origination number;

identifying second computing devices associated with the destination number based, at least in part, on data maintained by the wireless service provider and specified by one or more users of the wireless service provider;

initiating the communication to one or more of the second computing devices; and modifying a communication record associated with the communication by replacing the calling number in the communication record with the origination number such that it appears to the one or more of the second computing devices that the communication originated at the origination number.

2. The computer-implemented method of claim 1, wherein the data maintained by the wireless service provider is a hunt group that includes identifying data for the second computing devices.

3. The computer-implemented method of claim 1, wherein the data maintained by the wireless service provider is registration data that specifies the second computing devices that are associated with the destination number.

4. The computer-implemented method of claim 1, wherein the second computing devices are associated with different subscribers of the wireless service provider.

5. The computer-implemented method of claim 1, further comprising, determining an in-use computing device from the second computing devices, and initiating the communication to the in-use computing device.

6. The computer-implemented method of claim 5, wherein one or more of the first computing device or the second computing devices are non-sim based computing devices.

7. A non-transitory computer-readable media storing computer-executable instructions that, when executed, cause one or more processors of a computing device to perform acts comprising:

receiving a request to initiate a communication from a first computing device, the request specifying a calling number associated with the first computing device, an origination number different from the calling number, and a destination number;
authenticating the request by determining that an account associated with the calling number is authorized to originate communications from the origination number;
identifying second computing devices associated with the destination number, the second computing devices associated with the destination number by one or more users of a wireless service provider;
identifying one or more of the second computing devices to initiate the communication with;
initiating the communication with the one or more of the second computing devices; and
modifying a communication record associated with the communication by replacing the calling number in the communication record with the origination number such that it appears to the one or more of the second computing devices that the communication originated at the origination number.

8. The non-transitory computer-readable media of claim 7, wherein identifying the second computing devices associated with the destination number comprises accessing a hunt group maintained by the wireless service provider.

9. The non-transitory computer-readable media of claim 7, wherein identifying the second computing devices associated with the destination number comprises accessing registration data maintained by the wireless service provider.

10. The non-transitory computer-readable media of claim 7, wherein the acts further comprise, determining an in-use computing device from the second computing devices, and initiating the communication to the in-use computing device.

11. The non-transitory computer-readable media of claim 7, wherein the acts further comprise, synchronizing a message thread between the second computing devices.

12. The non-transitory computer-readable media of claim 7, wherein one or more of the first computing device or the second computing devices are non-sim based computing devices.

13. The non-transitory computer-readable media of claim 7, wherein identifying the second computing devices associated with the destination number comprises identifying one or more E.164 addresses or International Mobile Subscriber Identities (IMSI) that are associated with the destination number.

14. The non-transitory computer-readable media of claim 7, wherein one or more of the second computing devices are associated with different subscribers of a wireless service provider.

15. A system comprising:
one or more processors; and
one or more memories storing instructions that, when executed by the one or more processors, perform acts including:
  receiving a request to initiate a communication from a first computing device, the request specifying a calling number associated with the first computing device, an origination number different from the calling number, and a destination number;
  authenticating the request by determining that an account associated with the calling number is authorized to originate communications from the origination number;
  identifying second computing devices associated with the destination number, the second computing devices associated with the destination number by one or more users of a wireless service provider;
  initiating the communication to one or more of the second computing devices; and
  modifying a communication record associated with the communication by replacing the calling number in the communication record with the origination number such that it appears to the one or more of the second computing devices that the communication originated at the origination number.

16. The system of claim 15, wherein identifying the second computing devices associated with the destination number comprises accessing a hunt group maintained by the wireless service provider.

17. The system of claim 15, wherein the acts further comprise, determining an in-use computing device from the second computing devices, and initiating the communication to the in-use computing device.

18. The system of claim 15, wherein the acts further comprise, synchronizing a message thread between the second computing devices.

* * * * *